US012261859B2

United States Patent
Manhas et al.

(10) Patent No.: US 12,261,859 B2
(45) Date of Patent: Mar. 25, 2025

(54) SYSTEM AND METHOD FOR CAPTURING MALICIOUS FLOWS AND ASSOCIATED CONTEXT FOR THREAT ANALYSIS

(71) Applicant: VMware LLC, Palo Alto, CA (US)

(72) Inventors: Robin Manhas, Santa Clara, CA (US); Nafisa Mandliwala, Sunnyvale, CA (US); Sirisha Myneni, Santa Clara, CA (US); Srinivas Ramaswamy, Dublin, CA (US)

(73) Assignee: VMWare LLC, Palo Alto, CA (US)

( * ) Notice: Subject to any disclaimer, the term of this patent is extended or adjusted under 35 U.S.C. 154(b) by 322 days.

(21) Appl. No.: 17/985,089

(22) Filed: Nov. 10, 2022

(65) Prior Publication Data

US 2024/0163294 A1 May 16, 2024

(51) Int. Cl.
*H04L 9/40* (2022.01)
(52) U.S. Cl.
CPC ...... *H04L 63/1416* (2013.01); *H04L 63/1425* (2013.01); *H04L 63/1441* (2013.01)
(58) Field of Classification Search
CPC ............. H04L 63/1416; H04L 63/1425; H04L 63/1441
See application file for complete search history.

(56) References Cited

U.S. PATENT DOCUMENTS

| | | | | |
|---|---|---|---|---|
| 8,204,905 B2 * | 6/2012 | Kuo | ........................ | G06Q 30/02 707/780 |
| 9,842,112 B1 * | 12/2017 | Heer | ...................... | G06F 16/148 |
| 11,663,105 B2 * | 5/2023 | Zhou | ...................... | G06V 10/955 707/E17.039 |
| 2008/0125887 A1 * | 5/2008 | Case | .................. | G05B 23/0272 700/83 |
| 2012/0290847 A1 * | 11/2012 | O'Connor | ............... | H04L 63/30 713/150 |

(Continued)

FOREIGN PATENT DOCUMENTS

GB 2403625 A 1/2005

OTHER PUBLICATIONS

Non-Published Commonly Owned U.S. Appl. No. 18/196,367, filed May 11, 2023, 36 pages, VMware, Inc.

*Primary Examiner* — J. Brant Murphy
(74) *Attorney, Agent, or Firm* — Quarles & Brady LLP

(57) ABSTRACT

Some embodiments of the invention provide, for an intrusion detection and prevention system (IDPS) engine operating on a host computer deployed in a software-defined datacenter (SDDC), a method for detecting and analyzing malicious packet flows. Upon detecting a new packet flow, the method captures packets belonging to the new packet flow in a file. When the new packet flow ends, the method determines that a particular packet belonging to the new packet flow has triggered an alert indicating the particular packet includes a potentially malicious payload. The method annotates the file for the new packet flow with a set of contextual data that (1) specifies the new packet flow as a potentially malicious packet flow and (2) identifies the particular packet and at least one signature associated with the alert triggered by the particular packet. The method sends the annotated file to a network management server to analyze the set of contextual data to extract further information regarding the potentially malicious payload.

20 Claims, 8 Drawing Sheets

(56) References Cited

U.S. PATENT DOCUMENTS

| | | | | |
|---|---|---|---|---|
| 2013/0298230 | A1* | 11/2013 | Kumar | G06F 21/52 |
| | | | | 726/22 |
| 2014/0331280 | A1* | 11/2014 | Porras | H04L 63/20 |
| | | | | 726/1 |
| 2015/0095359 | A1* | 4/2015 | Duxbury | G06F 16/90344 |
| | | | | 707/758 |
| 2015/0310014 | A1* | 10/2015 | Yishay | G06F 16/90344 |
| | | | | 707/728 |
| 2017/0329783 | A1* | 11/2017 | Singh | H04L 63/1441 |
| 2018/0295036 | A1* | 10/2018 | Krishnamurthy | H04L 43/026 |
| 2019/0238429 | A1* | 8/2019 | Chanda | H04L 63/0263 |
| 2019/0268357 | A1* | 8/2019 | Rostamabadi | G06F 21/56 |
| 2021/0019412 | A1* | 1/2021 | Hewlett, II | G06F 21/565 |
| 2021/0021611 | A1* | 1/2021 | Hewlett, II | H04L 63/145 |
| 2021/0081461 | A1* | 3/2021 | Zhou | G06V 10/955 |
| 2021/0152581 | A1* | 5/2021 | Hen | G06F 21/604 |
| 2021/0182388 | A1* | 6/2021 | Myneni | G06N 5/04 |
| 2021/0192043 | A1* | 6/2021 | Bhary | G06F 21/56 |
| 2021/0385138 | A1* | 12/2021 | Watson | H04L 9/088 |
| 2023/0013808 | A1* | 1/2023 | Myneni | H04L 63/1425 |
| 2023/0014040 | A1* | 1/2023 | Mandliwala | H04L 63/1425 |
| 2023/0014706 | A1 | 1/2023 | Myneni et al. | |
| 2023/0015632 | A1* | 1/2023 | Myneni | G06F 9/54 |
| 2023/0018434 | A1* | 1/2023 | Mandliwala | G06F 21/554 |
| 2023/0021269 | A1* | 1/2023 | Mandliwala | G06F 21/566 |

* cited by examiner

```
{                                       205
"profile_severity" : ["CRITICAL"],
"criteria" : [{
"filter_name" : "CVSS",
"filter_value" : ["MEDIUM"],
"resource_type" : "IdsProfileFilterCriteria"
}],
"resource_type" : "IdsProfile",
"marked_for_delete" : false,     210
"overridden" : false "pcap_enabled" : true
}                           220
```

*Figure 2*

| No. | Time | Source | Destination | Protocol | Length | Stream Index | Comment | Info |
|---|---|---|---|---|---|---|---|---|
| 1 | 2022-01-02 20:19:30,010180 | 192.168.253.132 | 192.168.253.2 | DNS | 77 | | PID=1764 | Standard query 0x2b75 A abc.com |
| 2 | 2022-01-02 20:19:30,154730 | 192.168.253.2 | 192.168.253.132 | DNS | 93 | | PID=0 | Standard query response 0x2b75 A |
| 3 | 2022-01-02 20:19:30,168472 | 192.168.253.132 | 96.126.103.196 | ICMP | 74 | | PID=4600 | Echo (ping) request id=0x0001, seq |
| 4 | 2022-01-02 20:19:30,336649 | 96.126.103.196 | 192.168.253.132 | ICMP | 74 | | PID=0 | Echo (ping) reply id=0x0001, seq= |
| 5 | 2022-01-02 20:19:31,019430 | 192.168.253.132 | 192.168.253.2 | DNS | 91 | | PID=1764 | Standard query 0xd285 A settings- |
| 6 | 2022-01-02 20:19:31,043247 | 192.168.253.2 | 192.168.253.132 | DNS | 154 | | PID=6440 | Standard query response 0xd285 A |
| 7 | 2022-01-02 20:19:31,047139 | 192.168.253.132 | 52.156.204.185 | TCP | 66 | 0 | PID=6440 | 49689->443 [SYN] Seq=0 Win=64 |
| 8 | 2022-01-02 20:19:31,086110 | 52.156.204.185 | 192.168.253.132 | TCP | 60 | 0 | PID=7164 | 443->49689 [SYN, ACK] Seq=0 A |
| 9 | 2022-01-02 20:19:31,086182 | 192.168.253.132 | 52.156.204.185 | TCP | 54 | 0 | PID=7164 | 49689->443 [ACK] Seq=1 Ack=1 |
| 10 | 2022-01-02 20:19:31,087611 | 192.168.253.132 | 52.156.204.185 | TLSV1.2 | 246 | | PID=6440 | Client Hello |

▽Packet comments — 410
  ▽PID=4600 — 420
    >[Expert Info (Comment/Comment): PID=4600]
>[Expert Info (Comment/Comment): PID=4600] — 430
>Frame 3: 74 bytes on wire (592 bits), 74 bytes captured (592 bits) on interface 0 (outbound)
>Ethernet II, Src: Provider_25:d8:fd (00:0c:29:25:d8:fd), Dst: Provider_ed:87:3b (00:50:56:ed:87:3b) — 440
>Internet Protocol Version 4, Src: 192.168.253.132, Dst: 96.126.103.196 — 450
>Internet Control Message Protocol — 460

*Figure 4*

SYSTEM AND METHOD FOR CAPTURING MALICIOUS FLOWS AND ASSOCIATED CONTEXT FOR THREAT ANALYSIS

BACKGROUND

Today, distributed intrusion detection and prevention systems (IDPS) are loaded with a set of signatures, receive incoming network packets from the kernel, and compare these packets against the loaded signatures. When there is a match, an alert is generated when in detect mode, and additionally drop/reject the packet when in prevent mode. However, the alert data is insufficient for a user to further investigate the reason for which the alert was generated, despite the necessity of further investigation for prevent mode, where traffic can be dropped in case of a signature match. The end-user does not have any way to store and tag the malicious packet payload that triggered the alert with additional metadata for further debugging.

BRIEF SUMMARY

Some embodiments of the invention provide, for an intrusion detection and prevention system (IDPS) engine operating on a host computer deployed in a software-defined datacenter (SDDC), a method for detecting and analyzing malicious packet flows. Upon detecting a new packet flow, the method captures packets belonging to the new packet flow in a single file (e.g., a PCAP file). When the new packet flow ends, the method determines that a particular packet belonging to the new packet flow has triggered an alert indicating the particular packet includes a malicious payload. The method annotates the single file for the new packet flow with a set of contextual data that (i) specifies the new packet flow as a malicious packet flow and (ii) identifies the particular packet and at least one signature triggered by the particular packet. The method sends the annotated single file to a network management server for further analysis.

In some embodiments, the IDPS engine is part of a distributed IDPS that includes multiple IDPS engines deployed across multiple host computers and multiple network forwarding elements (e.g., edge routers, switches, and any other forwarding elements that process packets in the SDDC), and the network management server receives annotated single files from the multiple IDPS engines. The network management server, in some embodiments, provides the annotated single files received from the distributed IDPS engines to a network administrator through a user interface provided by the network management server. In some embodiments, the IDPS engine sends the annotated files to a designated datastore rather than directly to the network management server.

After the IDPS engine sends the annotated single file to the network management server, in some embodiments, the IDPS engine then deletes the annotated single file from, e.g., a PCAP file storage of the IDPS engine. In some embodiments, the IDPS engine detects another new packet flow and begins to capture packets belonging to the other new packet flow in a second single file. When the other new packet flow ends and the IDPS engine determines that the other new packet flow has not triggered any alerts, the IDPS engine deletes the single file for the other new packet flow without sending the file to the network management server, according to some embodiments.

In some embodiments, the set of contextual data that the IDPS engine annotates the single file with includes metadata associated with the packet flow, as well as individual packets in the packet flow. Examples of the contextual data used to annotate the single file, in some embodiments, includes virtual machine (VM) unique user identifier (UUID), IDPS profile UUID, IDPS rule identifier, user identifier, process identifier, and interface identifier. The IDPS engine, in some embodiments, stores the single file in a PCAP file storage using a naming convention that includes a five-tuple identifier associated with the new flow.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 2 illustrates an example of an IDPS profile in some embodiments.

FIG. 4 illustrates an example of a per-packet comment in a PCAP file, in some embodiments.

DETAILED DESCRIPTION

Figure 1:
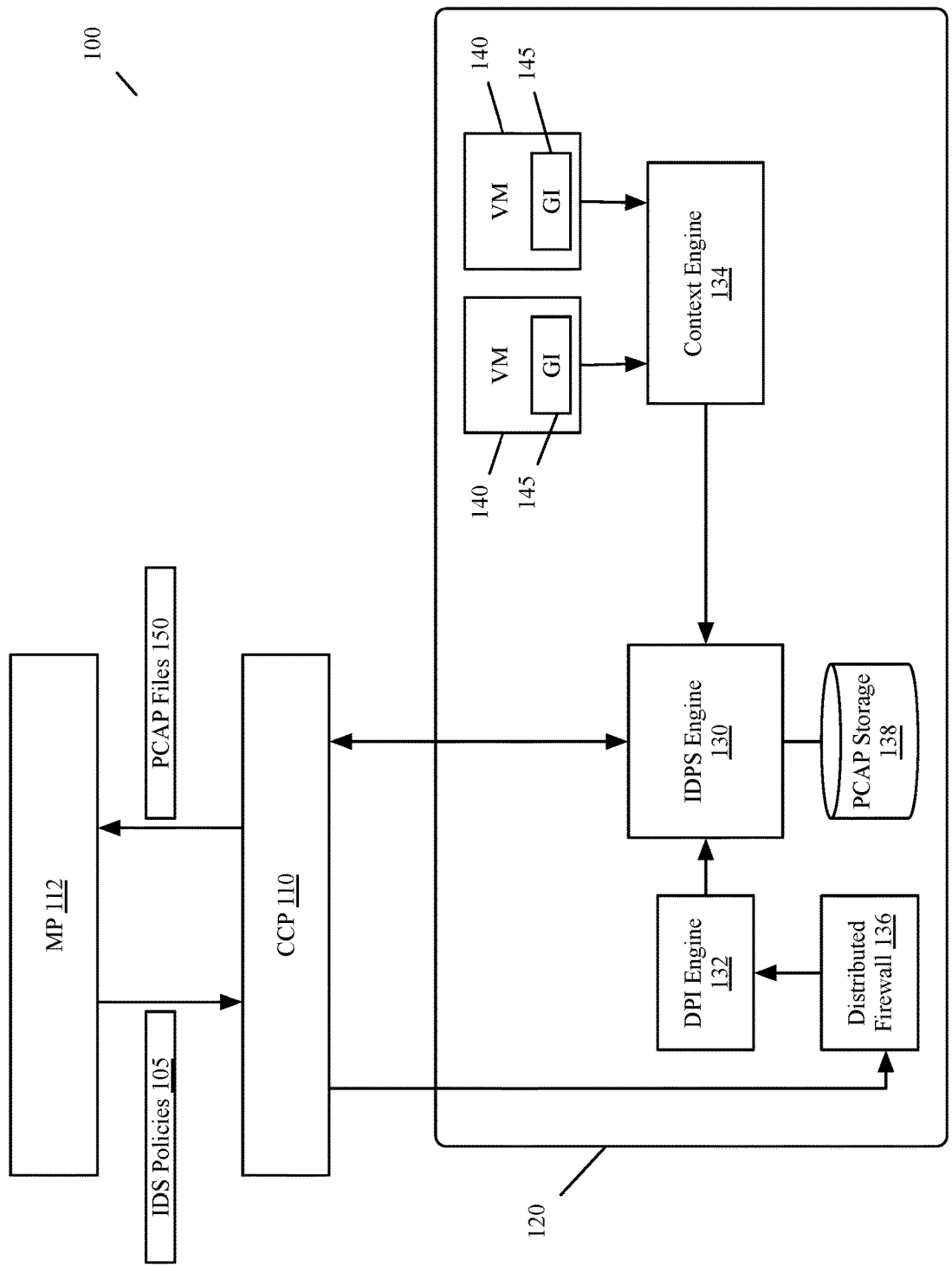
FIG. 1 illustrates a simplified example of a software-defined datacenter (SDDC) of some embodiments in which the intrusion detection and prevention system (IDPS) described herein is implemented.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide, for an intrusion detection and prevention system (IDPS) engine operating on a host computer deployed in a software-defined datacenter (SDDC), a method for detecting and analyzing malicious packet flows. Upon detecting a new packet flow, the method captures packets belonging to the new packet flow in a single file (e.g., a PCAP file). When the new packet flow ends, the method determines that a particular packet belonging to the new packet flow has triggered an alert indicating the particular packet includes a malicious payload. The method annotates the single file for the new packet flow with a set of contextual data that (i) specifies the new packet flow as a malicious packet flow and (ii) identifies the particular packet and at least one signature triggered by the particular packet. The method sends the annotated single file to a network management server for further analysis.

In some embodiments, the IDPS engine is part of a distributed IDPS that includes multiple IDPS engines deployed across multiple host computers and multiple network forwarding elements (e.g., edge routers, switches, and any other forwarding elements that process packets in the SDDC), and the network management server receives annotated single files from the multiple IDPS engines. The network management server, in some embodiments, provides the annotated single files received from the distributed IDPS engines to a network administrator through a user interface provided by the network management server. In some embodiments, the IDPS engine sends the annotated files to a designated datastore rather than directly to the network management server.

After the IDPS engine sends the annotated single file to the network management server, in some embodiments, the IDPS engine then deletes the annotated single file from, e.g., a PCAP file storage of the IDPS engine. In some embodiments, the IDPS engine detects another new packet flow and begins to capture packets belonging to the other new packet flow in a second single file. When the other new packet flow ends and the IDPS engine determines that the other new packet flow has not triggered any alerts, the IDPS engine deletes the single file for the other new packet flow without sending the file to the network management server, according to some embodiments.

In some embodiments, the set of contextual data that the IDPS engine annotates the single file with includes metadata associated with the packet flow, as well as individual packets in the packet flow. Examples of the contextual data used to annotate the single file, in some embodiments, includes virtual machine (VM) unique user identifier (UUID), IDPS profile UUID, IDPS rule identifier, user identifier, process identifier, and interface identifier. The IDPS engine, in some embodiments, stores the single file in a PCAP file storage using a naming convention that includes a five-tuple identifier associated with the new flow.

FIG. 1 illustrates a simplified example of an SDDC 100 of some embodiments in which the IDPS described herein is implemented. As shown, the SDDC 100 includes a management plane (MP) 112, a central control plane (CCP) 110, and a host computer 120. The host computer 120 includes an IDPS engine 130, a PCAP storage 138, a deep packet inspection (DPI) engine 132, a context engine 134, a distributed firewall 136, and a set of VMs 140.

The management plane 112 is implemented by one or more network managers that are responsible for receiving user-defined intent (i.e., through a user interface (UI) (not shown) provided by the management plane 112) in the form of intent-based API commands, translating this intent into one or more context-based intrusion detection scripts (also referred to herein as intrusion detection rules), and providing these scripts to a set of network controllers that implement the central control plane 110 for distribution to SDDC resources (e.g., the IDPS engine 130) for enforcement.

In addition to the scripts, the network managers implementing the management plane 112 also provide filtered sets of intrusion detection signatures to the set of network controllers for distribution to the SDDC resources, according to some embodiments. Each signature is representative of a pattern of activity or malicious content (e.g., in a header of payload of a packet) that is known to be associated with specific attacks (i.e., intrusions), according to some embodiments. Each of the filtered sets of intrusion detection signatures provided by the management plane 112, in some embodiments, are sets of intrusion detection signatures selected by a user (i.e., through a UI) to be applied to specific sets of processes.

In some embodiments, the signatures are applied to intrusion detection and prevention rules through IDPS profiles. A single profile is applied to matching traffic, in some embodiments. IDPS profiles, in some embodiments, are used to group signatures and are then applied to specified applications. A default IDPS profile includes critical severities and cannot be edited, according to some embodiments. In some embodiments, signature severities can assist end-users (e.g., network administrators, security teams, etc.) to prioritize intrusion and threat events. The signature severities of some embodiments are divided into four hierarchical levels that include critical (i.e., the highest severity), followed by high, medium, and low.

Threats and intrusions that fall under the critical severity level, in some embodiments, can include attempted/unsuccessful/successful user privilege gain, attempted or successful administrator privilege gain, detection of executable code, detection of a network trojan, web application attack, detection of inappropriate content, potential corporate privacy violation, detection of targeted malicious activity, detection of exploit kit activity, detection of domain observed used for C2, detection of successful credential theft, etc. The threats and intrusions that fall under the high severity level, in some embodiments, can include potentially bad traffic, information leak, attempted or detected denial of service, detection of a suspicious file name or username, detection of a non-standard protocol or event, detection of a possibly unwanted program, etc. Medium security level threats and intrusions, in some embodiments, can include unknown traffic, detection of a suspicious string or network scan, generic protocol command decode, etc. Lastly, in some embodiments, low severity threats and intrusions can include detection of a TCP connection, non-specific potential attacks, misconfigured traffic, attempted or successful exploitations of administrative-level or user-level vulnerability, indication of an active backdoor channel, detection of a specific virus, worm propagation, etc.

In some embodiments, the actions triggered by a matching signature include alert, drop, and reject. When the action is alert, an alert is generated and no automatic preventative action is taken, according to some embodiments. For packets that match to signatures that specify drop as the action, in some embodiments, an alert is generated and the matching packet or packets are dropped. In some embodiments, when the matching signature specifies to reject the packet, an alert is generated and the packet is dropped. In some such embodiments, when the packet flow is a TCP flow, a TCP reset packet is generated by the IDPS engine and sent to the source and destination of the connection, while for other protocols, an ICMP-error packet is instead sent to the source and destination of the connection.

The signatures, in some embodiments, can also include signatures called flowbits signatures or "xbits", which are used in conjunction with secondary signatures. Flowbits signatures, in some embodiments, capture a particular type of traffic (i.e., a particular flow) which is then fed to other signatures that can trigger an alert or block action, which are intentionally set to be silent (i.e., no-alert) because they would trigger false positives, according to some embodiments, while xbits work the same as flowbits, but across different flows rather than for a particular flow. Accordingly, in some such embodiments, any signature with "flowbits: noalert" or "xbits:noalert" should not be set to drop.

In some embodiments, to handle the cases like flowbits/xbits, whenever a packet sets an xbit, the information is stored in the IDPS structures, and the PCAP file is marked to not be deleted until a configurable time duration. If a different flow checks for this xbit being set and raises an alert, the PCAP files of both flows are sent to the management plane. In some embodiments, each xbit set has an expiry time. If no other packet flow checks for this set xbit, and IDPS removes it from internal structures, the corresponding PCAP file is also deleted, according to some embodiments.

FIG. 2 illustrates an example of an IDPS profile 200 in some embodiments. As shown, the IDPS profile 200 specifies severity for the profile as critical at 205, and indicates at 210 the resource type as "IdsProfile" (i.e., intrusion detection system (IDS) profile). Additionally, the IDPS profile 200 includes at 220 an additional flag "pcap_enabled" which is set to true (i.e., packet capture is set to true).

The central control plane 110 in some embodiments collects (i.e., receives) contextual attributes from the IDPS engine 130 on the host computer 120, and provides the contextual attributes to the management plane 112. In some embodiments, the central control plane 110 collects attributes and information from other sources not on the host computer 120, such as intrusion detection signatures and/or detected threats from other host computers, compute context from one or more servers (e.g., cloud context from cloud vendors, or compute virtualization context by datacenter virtualization software), identity context from directory service servers, mobility context from mobility management servers, endpoint context from DNS (domain name server) and application inventory servers, network context (e.g., virtual network context from network virtualization server), etc.

The collection of contextual information (e.g., information from the IDPS engine, DPI engine, and context engine and/or information from other context sources), in some embodiments, allows the management plane 112 to provide a user interface (UI) to the network/compute administrators to visualize the compute and network resources in the datacenter, and to alert the network/compute administrators of any detected threats/intrusions. Moreover, the rich set of contextual attributes collected from a variety of sources allow the management plane 112 to provide controls through this UI for these administrators to continue to define/declare intent for intrusion detection to be translated into intrusion detection signatures that can be enforced on the data plane, as well as to specify other context-based service rules and/or policies. These intrusion detection rules, intrusion detection signatures, and service rules/policies are then distributed to resources in the datacenter so that service engines can perform context-based service operations and continue to provide information to the central control plane/management plane.

The intent-based API command in some embodiments is a simple declaratory statement of intent. For example, in some embodiments, the simple declaratory statement specifies to alert the management plane 112 (i.e., via a set of network controllers or network managers) when certain conditions are detected. In some embodiments, for example, a host computer 120 may detect an ongoing advanced persistent threat (APT), and specify intent to stop the detected APT and prevent additional APTs. The APT in some embodiments is detected based on a user attempting to use a hash-based login approach as opposed to a standard username/password approach, a user trying to connect on multiple hosts at the same time, a user requesting privilege escalation, a flow of data flowing through an inter-process communication (IPC) socket, or a significant amount of data being uploaded through IPC sockets. An example of a simple declaratory statement of intent to prevent such attacks, in some embodiments, may include "deny if user ANY AND has N number of failed logins AND tries to start process Y OR process Z".

In some embodiments, the intent-based API command is a hierarchical API command that includes two or more commands that define or modify the intent for (1) one or more application segments, and (2) one or more policies associated with the application segments. The different commands in the hierarchical API command can be nested under other commands, e.g., the definition of one group of applications can include the definition of specific machines (e.g., specific VMs) to implement specific applications in the group, according to some embodiments.

In some embodiments, hierarchical API commands are provided to administrators as predefined events and attributes that can be used by the administrators to create their "intent" for defining intrusion detection signatures. In some embodiments, as flows are processed, the management plane 112 receives additional attributes from various sources in the SDDC, and provides these additional attributes for use by administrators to create additional rules and/or modify existing rules based on real-time (i.e., current) conditions. Additionally, some embodiments provide predefined templates that encapsulate well-known applications and their dependencies, as well as an ability to model the applications based on the administrator's requirements.

In some embodiments, the hierarchical API command is defined in a declarative language. In some embodiments, an intrusion detection system framework that is part of the management plane 112 parses the hierarchical API command into several commands that (1) direct compute managers in the SDDC to deploy and configure the application segments of the multi-segment application defined in the hierarchical API command, and (2) direct the network managers in the SDDC to define and deploy intrusion detection and prevention rules for the application segments as specified by the user-defined intent. Also, in some embodiments, the management plane/central control plane further directs the network managers to define and deploy network forwarding and service rules for implementing communication profiles between the application segments as specified by the hierarchical API command, or other configuration data, and between application segments and other applications.

The UI provided by the management plane 112, in some embodiments, also enables users to select one or more PCAP files and select "Request PCAP download". In some such embodiments, the API to request PCAP file download returns a task identifier which the UI can poll in order to determine whether the zipped PCAP file is available. A separate API to download the PCAP file is then issued, in some such embodiments. In some embodiments, the management plane 112 is configured to periodically delete PCAP files from storage. Also, in some embodiments, a PCAP download request cannot be fulfilled if the disk memory is full. In some such embodiments, an error message is returned to the requesting user indicating the same.

In some embodiments, the application segments are deployed as VMs or containers executing on host computers, and/or as standalone computers, in the SDDC. Similarly, network forwarding and service rules in some embodiments are processed by software forwarding elements (e.g., software switches and routers) and software middlebox service VMs (e.g., a distributed firewall, as well as other service containers and/or service modules executing on the host computers in the SDDC), while the intrusion detection scripts and intrusion detection signatures are processed by IDPS engines distributed across the host computers and other elements in the SDDC that process packet flows (e.g., the software forwarding elements deployed in the SDDC). The software forwarding and service rules are also configured in some embodiments on hardware forwarding elements (e.g., top-of-rack switches), standalone hardware or software gateways, and/or standalone middlebox appliances in the SDDC.

The intrusion detection signatures and intrusion detection scripts in some embodiments are used to detect both anomalous user behavior (e.g., >N number of failed login attempts by a single user), as well as anomalous packet traffic behavior (e.g., >N number of sources attempting to access a particular resource at the same time). In some embodiments, a context-based intrusion detection script can be based on any of number of attempts to access a particular resource, the type of resource at which the access attempts are aimed, the time of day of the access attempts, a user identifier or group identifier associated with a flow, etc.

The IDPS engine 130 provides intrusion detection and prevention services based on the intrusion detection signatures and intrusion detection scripts provided by the management plane 112, as well as contextual attributes received from the context engine 134 and the DPI engine 132. The IDPS engine 130, in some embodiments, is configured to capture packets for each flow it detects in a single file (e.g., PCAP file). Upon detecting a new flow, the IDPS engine 130 of some embodiments generates a PCAP file for the flow by generating copies of packets in the flow (i.e., so as not to hold up the flow) while allowing the flow to continue on to its destination. The packets flows detected by the IDPS engine 130 include ingress flows and egress flows (e.g., flows to and from the VMs 140), according to some embodiments.

When the IDPS engine 130 generates a new PCAP file for a newly detected flow, the IDPS engine 130 of some embodiments names the generated PCAP file according to the packet flow's five-tuple identifier, e.g., flow_SrcIp_SrcPort_DstIp_DstPort_Direction.pcap. The IDPS engine 130 then stores the newly generated PCAP file in the PCAP storage 138. In some embodiments, due to the amount of memory utilized when multiple simultaneous flows are processed by components of the host computer 120, the PCAP storage 138 is stored on Ramdisk of the host computer 120. In other embodiments, port mirroring is used to store the PCAP files on a different machine (e.g., different VM). If any packets belonging to the packet flow trigger any alerts, signature IDs corresponding to those alerts are added to the file for the packet flow.

After the packet flow has ended, if no alerts have been triggered by the packet flow, the IDPS engine 130 deletes the PCAP file for the packet flow from the PCAP storage 138. Otherwise, if any alerts have been triggered by any packets belonging to the packet flow, the IDPS engine 130 forwards the PCAP file 150 for the packet flow to the CCP 110, which provides the PCAP file 150 to the management plane 112. After the IDPS engine 130 forwards the PCAP file 150, the IDPS engine 130 deletes that PCAP file from the PCAP storage 138 on the host computer 120, according to some embodiments. The management plane 112, in some embodiments, stores the received PCAP files 150 in a PCAP file storage (not shown), where the PCAP files 150 can be accessed by network administrators through a UI (not shown) provided by the management plane 112.

Back on the host computer 120, in order to provide contextual attributes to the IDPS engine 130, the context engine 134 registers with the GI agents 145 executing on the VMs 140 as mentioned above to receive contextual attributes collected by the GI agents 145 during processes performed by the VMs 140 on packets of various flows. While illustrated as VMs in the datacenter 100, the VMs 140 can be other types of machines in other embodiments, such as containers, while the GI agents 145 are modules executing within memory space of the containers. In still other embodiments, the machines are a mix of VMs and containers.

On each VM 140, a GI agent 145 executes in order to collect contextual attributes for the context engine 134. While shown as direct communications in this example, all of the communication between the context engine 134 and the GI agents 145 in some embodiments are relayed through a MUX (not shown). One example of such a mux is the mux that is used by the Endpoint Security (EPSec) platform of ESX hypervisors of VMware, Inc. In some embodiments, the GI agents 145 communicate with the MUX through a fast communication channel (such as VMCI channel of ESX). In some embodiments, this communication channel is a shared memory channel.

In some embodiments, the context engine 134 collects contextual attributes from the GI agents 145 installed on VMs 140 on its host through a variety of different ways. For instance, in some embodiments, the GI agent on a DCN registers hooks (e.g., callbacks) with one or more modules (e.g., kernel-space modules or user-space modules) in the VM's operating system (OS) for all new network connection events and all new process events.

Upon occurrence of a new network connection event, the GI agents 145 provide a network event identifier to the context engine 134, in some embodiments. The network event identifier provides a set of attributes pertaining to the network event. These network event attributes in some embodiments include a five-tuple identifier (i.e., source port and IP address, destination port and IP address, and protocol) of the requested network connection, process identifier of the process requesting the network connection, a user identifier associated with the requesting process, and a group identifier (e.g., an activity directory (AD) identifier) associated with the requesting process.

In some embodiments, the context engine 134 receives additional process parameters from the GI agents 145. These additional process parameters in some embodiments include the process name, the process hash, the process path with command line parameters, the process network connection, the process-loaded modules, and one or more process consumption parameters specifying the process' consumption of one or more resources of the machine (e.g., central processing unit consumption, network consumption, and memory consumption). Instead of receiving all of the processing parameters associated with a network event in one shot, the context engine 134 in other embodiments uses the process identifier to query the GI agents 145 for additional process parameters associated with a network event.

The OS of the VM 140 in some embodiments holds up a new network event (i.e., does not start sending packets for the network event) until the GI agent 145 on that VM 140 directs it to proceed with processing the network event. In some of these embodiments, the GI agent 145 only allows the OS to proceed with processing the network event after the context engine 134 has collected all the needed attributes for this event (e.g., after receiving a message from the context engine that specifies that it has received all the process or network attributes that it needs for the new network event).

In some embodiments, the context engine 134 uses the process hash that it receives from the GI agent 145 to identify the name and version of the application (i.e., the software product) to which the process belongs. To do this, the context engine 134 in some embodiments stores process hashes and associated application names/versions, compares the process hash that it receives from the GI agent with the stored process hashes to identify a matching hash, and then uses the application name/version of the matching hash as the application name and version of the process associated with the event.

In some embodiments, the context engine 134 obtains the process hashes and application names/versions from one or more network or compute managers, which may operate on another device or computer. In other embodiments, the context engine 134 provides the hash associated with a process identifier to a network or compute manager, which then matches this hash to its process hash records and provides the application name/version of the associated process to the context engine. Once the context engine 134 obtains the application name/version associated with a network event, it can provide the name and version attributes to the attribute-based service engines, which can use this information (i.e., the application name and/or version) to identify the service rule to enforce.

Upon occurrence of a process event on a VM 140, the VM's GI agent 145 in some embodiments provides a process event identifier to the context engine 134. The process event identifier provides a set of attributes pertaining to the process event. This set of attributes includes the process identifier in some embodiments. In some embodiments, this set also includes a user identifier and/or a group identifier (e.g., an AD identifier).

In some embodiments, the GI agent 145 provides all of the process parameters (e.g., process identifier, user ID, group ID, process name, process hash, loaded module identifiers, consumption parameters, etc.) associated with a process event to the context engine 134 when it reports the process event to the context engine 134. In other embodiments, the context engine 134 directs the GI agent 145 to collect from the OS modules additional process parameters that are associated with the process identifier that the context engine 134 received with the process event. These additional process parameters in some embodiments are the same (e.g., process name, process hash, loaded module identifiers, consumption parameters, etc.) as the process parameters mentioned above for reported network events.

The IDPS engine 130 of some embodiments augments the contextual attributes that it receives from the context engine 134 with contextual attributes that it receives from other modules that execute on the host 120. The DPI engine 132 (also referred to as the deep packet inspector) is an example of such a module that provides contextual attributes to augment those that the context engine 134 collects from the GI agents 145, in some embodiments. The contextual attributes provided by the DPI engine 132, in some embodiments, include at least AppIDs (i.e., traffic types) associated with the packets that the DPI engine 132 inspects. While not shown, some embodiments also include a packet mirror to generate copies of packets to provide to the IDPS engine 130 along with the contextual attributes from the DPI engine 132 and context engine 134.

In some embodiments, the IDPS engine 130 is a host-based intrusion detection system that is installed in the host 120 and models normal behavior and builds statistical models around that normal behavior. Typical embodiments of host-based IDSs use system calls and anomalous program behavior to detect deviant behavior. In other embodiments, the IDPS engine 130 is part of a network-based IDS that is installed at various points in the network and inspect traffic passing through these points. Network-based IDSs can be hardware-based or software-based and typically inspect large amounts of data, according to some embodiments.

In some embodiments, a DPI engine 132 is directed by a distributed firewall 136 or another module (e.g., the context engine 134) to examine packets of a packet flow associated with a process ID to identify the type of traffic being sent in these packets by the application associated with the process ID. In some embodiments, the distributed firewall 136 directs the DPI engine 132 to examine the packets based on configuration data provided by network controllers of the central control plane 110. The DPI engine 132, in some embodiments, provides the traffic type (i.e., AppID) and any other data learned from inspecting the packet to the IDPS engine 130 along with a copy of the packet. In some embodiments, the DPI engine 132 copies the packets it inspects by providing the packets to a packet mirror (not shown) that copies packets and provides the copied packets to the IDPS engine 130, as mentioned above.

The IDPS engine 130 in some embodiments detects intrusions by utilizing one of or a combination of a signature-based system that matches packets with known malicious patterns (i.e., intrusion detection signatures) and an anomaly-based system (e.g., Zeek®) that detects behavior that deviates from normal traffic or user behavior. In some embodiments, utilizing a combination of signature-based and anomaly-based systems allows users to implement intrusion detection signatures generated based on user-defined intent.

The identified traffic-type identity is today commonly referred to as the AppID. Also, currently there are a number of DPI engines 132 that analyze messages of a packet flow to generate the AppID for the packet flow. In some embodiments, the context engine 134 combines the AppID that it obtains for a network event with other context attributes that it identifies for this event, in order to produce a very rich set of attributes that the service engines can then use to perform their services. This rich set of attributes provides true application identity (i.e., the application name, application version, application traffic type, etc.), based on which the service engines can perform their services. In some embodiments, the IDPS engine 130 uses a network event's five-tuple identifier to associate the AppID for this event's packet flow with the contextual attributes that the context engine 134 collects from the GI agent 145 of the VM 140 associated with the packet flow (e.g., of the VM, or other data computer node (DCN), from which the packet flow emanates). The IDPS engine 130 then adds some or all of the identified contextual attributes to the PCAP file for the flow, in some embodiments.

The IDPS engine 130 in some embodiments also includes a threat detection module (not shown) that provides a threat level indicator that specifies the threat level associated with a particular application that is executing on a VM 140. Once the context engine 134 obtains a set of process parameters that specify that a process has started on a machine (e.g., VMs) or is sending packets on the machine, the context engine 134 provides these process parameters (e.g., process hash, application name, application version, AppID, other process parameters, etc.) to the threat detection module of the IDPS engine 130.

This threat detection module then generates a threat level indicator (e.g., low, medium, high, etc.) for the identified process and provides this threat level indicator to the context engine 134. In some embodiments, the threat detection module assigns a threat score to an application running on a VM based on various application behavioral factors, such as (1) whether it does poor input validation, (2) whether it passes authentication credentials over unencrypted network links, (3) whether it uses weak password and account policies, (4) whether it stores configuration secrets in clear text, (5) whether it can transfer files, (6) whether the application is known to propagate malware, (7) whether the application is purposely evasive, (8) whether the application has known vulnerabilities, etc.

The context engine 134 in some embodiments provides the threat level indicator produced by the threat detection module of the IDPS engine 130 to one or more service engines, such as the distributed firewall 136, as another contextual attribute for performing services on a new process event or the packets of a new network event. The one or more service engines can use the threat level indicator, in some embodiments, as another attribute to identify service rules to enforce.

In some embodiments, the context engine 134 stores the contextual attributes that it collects for network events and process events in an attribute storage (not shown). This attribute storage, in some embodiments, is also accessible to the IDPS engine 130 and to the DPI engine 132. In some embodiments, the context engine 134 stores each set of contextual attributes with one or more network event identifiers and/or process identifiers. For example, in some embodiments, the context engine 134 stores the collected contextual attributes for a new process event with the process identifier, or with a reference to this identifier. The context engine 134 then uses the process identifier to provide the collected context attributes to a service engine (e.g., the distributed firewall 136) that performs a service for the process event.

The context engine 134 in some embodiments stores the collected context attributes for a new network connection event with the five-tuple identifier of the network connection event, or with a reference to this five-tuple identifier. In some of these embodiments, the context engine 134 provides to a service engine the context attributes for a network event along with this event's five-tuple identifier. The packets for this network event will use this five-tuple identifier, and hence the service engine can use the supplied five-tuple identifier to identify the context attributes associated with a packet flow.

The context engine 134 employs a push model in some embodiments to distribute the collected contextual attributes to services engines on the host computer 120, while in other embodiments this engine 134 employs a pull model to distribute these attributes to the service engines. In still other embodiments, the context engine 134 employs a push model for some service engines and a pull model for other service engines. In the push model, the context engine 134 in some embodiments distributes to a service engine the contextual attributes that it collects for a process event or a network event with the process's identifier and/or the network event's flow identifier (e.g., the flow's five-tuple identifier).

In some embodiments, the context engine distributes to the service engine only the contextual attributes that are relevant for that service engine's service rules. In other words, in these embodiments, the context engine compares each collected attribute in a set of collected attributes (e.g., for a network event or a process event) with a list of attributes used by a service engine's service rules, and discards each collected attribute that is not used by the service rules. The context engine then provides to the service engine only the subset of collected attributes (in the set of collected attributes) that is being used by the engine's service rules. In other embodiments, the service engines perform this filtering operation to discard the contextual attributes that are not needed.

In the pull model, the context engine receives queries from a service engine for the contextual attributes that the context engine has collected for a particular process or network connection. In some embodiments, the context engine receives a process ID or a flow identifier (e.g., five-tuple identifier) with a query from the service engine, and uses the received identifier to identify the attribute set that it has to provide to the service engine.

In some embodiments, the context engine generates a service token (also called a service tag) for the collection of attributes that are relevant for the service engine, and provides this service token to another module (e.g., the GI agent or another module on the host) to pass along to the service engine (e.g., pass along in a packet's encapsulating header). The service engine then extracts the service token and provides this service token to the context engine in order to identify the contextual attributes that the context engine has to provide to the service engine.

When it receives and correlates contextual attributes, in some embodiments, the IDPS engine 130 performs a matching operation to detect threats based on the correlated contextual attributes. For example, based on the correlated contextual attributes, the IDPS engine 130 can determine whether a specific type of application (e.g., specific type of medical application or financial application) executes on a particular VM and is sending out a particular type of data at a particular rate and volume, each data being one or more bits in a bit pattern (i.e., a generated signature) that gets mapped to a stored signature (i.e., a signature received from the central control plane 110 in a set of signatures filtered for the workloads performed in VMs 140 on the host computer 120). This signature is then added to the PCAP file 150 for the packet stored in the PCAP storage 138.

In some embodiments, the IDPS engine 130 retrieves the contextual attributes from the context engine 134 and DPI engine 132 on a per-packet basis (i.e., for every packet processed by elements on the host computer 120), or on a per-flow basis (i.e., for every N packet in a packet flow). In other embodiments, the context engine 134 and DPI engine 132 are configured to automatically provide contextual attributes to the IDPS engine 130 on a per-packet basis, or on a per-flow basis. Each generated signature, in some embodiments, is a generated pattern of bits. For instance, the IDPS engine 130 may request context from the DPI engine 132 and the context engine 134, receive 300 contextual attributes in response, and generate a bit pattern corresponding to the 300 contextual attributes. The IDPS engine 130 then compares the bit pattern with other bit patterns (i.e., signatures) received from the central control plane 110 to determine whether there are any matches.

When a generated signature matches a stored signature, in some embodiments, the IDPS engine 130 adds the signature to the PCAP file 150 for the packet flow, and, in some embodiments, also sends an alert through the central control plane 110 to the management plane 112. In some embodiments, the management plane 112 performs a specific action based on the alert, such as providing the alert in a report through a UI (not shown) for review by an administrator. Also, in some embodiments, the management plane 112 performs the specific action only upon receiving the PCAP file 150 that lists the triggered signatures, which is provided by the IDPS engine 130 after the packet flow has ended. In addition to matching a signature, the contextual attributes in some embodiments may also match an intrusion detection script. For example, the matching signature may indicate a particular unauthorized user has attempted to access a particular server, while the matching script may indicate that the particular unauthorized user has attempted to access the particular server a threshold number of times, and any additional packets from the particular unauthorized user should be dropped.

The PCAP file 150, in some embodiments, provides end-users (e.g., network administrators) with sufficient information to enable the end-users to further investigate the reason an alert was generated. The end-users can store and tag the malicious packet payload that triggered the alert with additional metadata that can be used for further debugging, which becomes necessary for intrusion prevention such that packets that match a particular signature can be dropped upon matching the particular signature.

Figure 3:
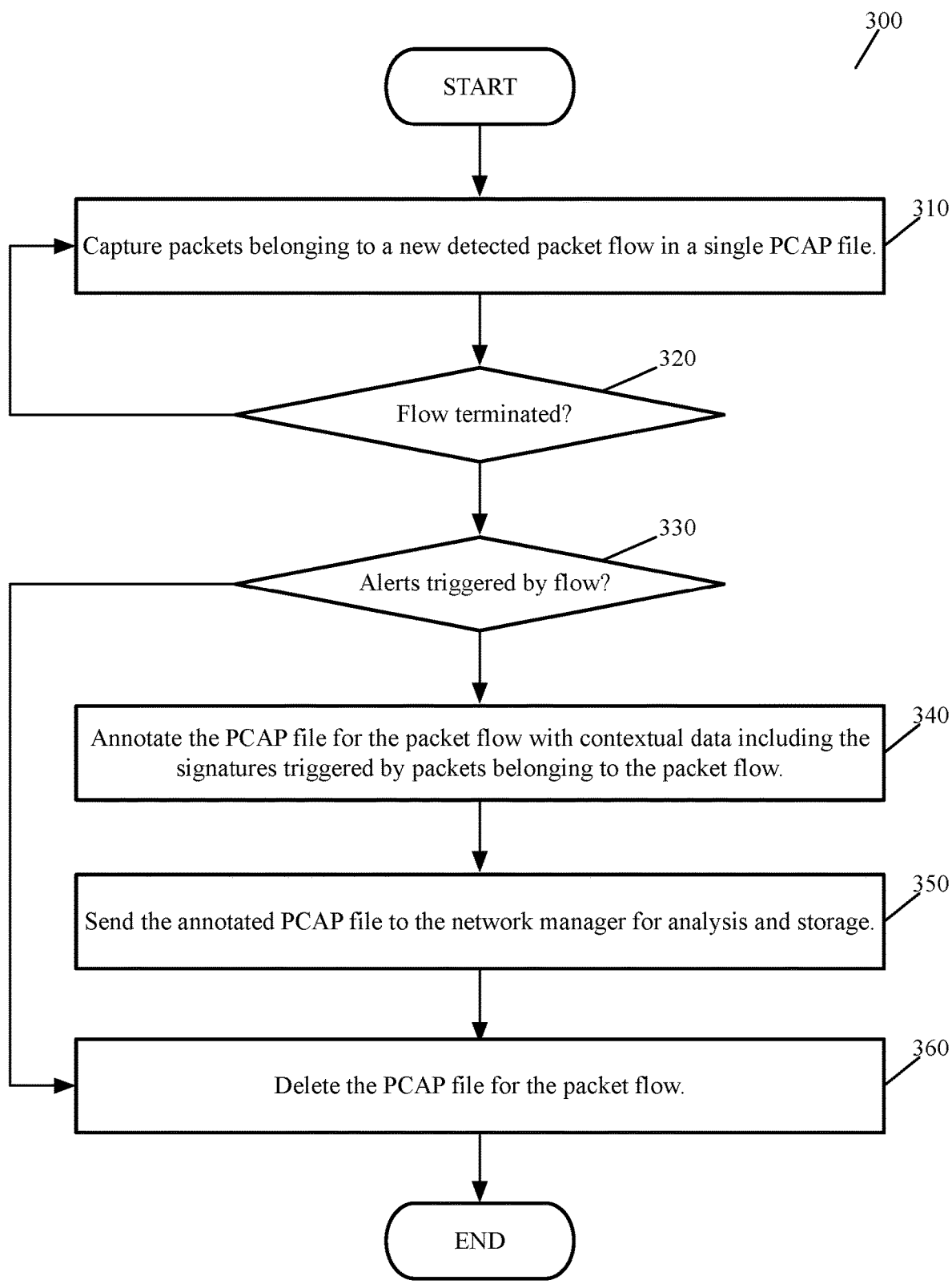
FIG. 3 conceptually illustrates a process performed by an IDPS engine, in some embodiments, to detect and identify malicious packet flows.

FIG. 3 conceptually illustrates a process 300 performed by an IDPS engine, in some embodiments, to detect and identify malicious packet flows. The process starts when the IDPS engine detects a new packet flow and captures (at 310) packets belonging to the newly detected packet flow in a single PCAP file. In some embodiments, the PCAP file is a PCAP next generation (PCAPNG) file format for implementing a PCAP snipping feature in the IDPS engine. PCAPNG files allow both top-level and per-packet comments, according to some embodiments. These fields can be used, in some embodiments, to send the process ID of an offending process, user information, OS information, intrusion signature ID, and other metadata (e.g., interface). Packet comments in the PCAPNG files are linked to each individual packet and can be versatile and valuable as it's a string. For instance, in some embodiments, when a packet in a packet flow matches a particular signature that results in the packet being dropped, the packet can be annotated in the PCAPNG file for the packet flow with a string indicating "{dropped:true}".

FIG. 4 illustrates an example of a per-packet comment in a PCAP file, in some embodiments. As shown, the PCAP file 400 includes a list of packets captured in the file, and a per-packet comment 410 associated with the third packet listed. The packet comment 410 specifies a packet identifier (PID) 4600 420 associated with the packet, the number of bytes (74) 430 captured, identities of the source and destination providers 440, the source and destination IP addresses 450 of the packet, and the protocol (ICMP) 460 used for the packet.

In addition to the information 420-460 included in the packet comments 410, any important information associated with a packet can be included, according to some embodiments. For instance, in some embodiments, process identifier of an offending process, user information, OS information, intrusion signature ID, host metadata (e.g., interface information), other contextual information collected by the context engine 134 (e.g., collected by a GI agent 145 on a VM 140 and provided to the context engine 134), etc. can be included in the packet comments 410.

In some embodiments, the packet comments are added to the PCAP files in order to provide sufficient information for users (e.g., network administrators) to investigate offending packets. The annotations, in some embodiments, greatly improve the debugging process and experience of the users as they remove the need for users to track multiple offending packets in order to debug any alerts raised by the offending packets. Additionally, in some embodiments, management and control components, such as the management plane 112 and/or central control plane 110, are configured to perform analyses on the PCAP files 150, and, in some embodiments, one or more packet comments trigger one or more actions by the management plane 112 and/or central control plane 110.

For instance, in some embodiments, a particular packet can be annotated with a particular signature triggered by the particular packet, and upon analyzing the PCAP file 150 that includes the particular packet and its corresponding comments, the management plane 112 and/or central control plane 110 may send, e.g., an alert to a network administrator identifying the particular signature and offending packet and packet flow. In another example, a packet comment that includes a particular signature can trigger the management plane 112 and/or central control plane 110 to instruct the host computer 120 to drop the offending packet., according to some embodiments. In some embodiments, the actions triggered are configured by a user (e.g., network administrator) based on previous PCAP files including packets that have triggered the same or similar signatures.

As illustrated in the SDDC 100 described above, the IDPS engine 130 stores the PCAP files it generates for each of the packet flows it processes in the a PCAP storage 138 on the host computer 120. In some embodiments, the PCAP storage 138 only stores PCAP files for current packet flows. To prevent the generation of large PCAP files, in some embodiments, a user-configurable setting is added to the configuration file for the IDPS engine 130 to enable end-users to cap the maximum PCAP file size captured by the IDPS process. In some embodiments, a PCAP identifier and file size as configured by an end-user are added to an intrusion detection system summary (IDS-summary) API. This API, in some embodiments, can also be reused to list PCAPs on a dashboard made available to end-users.

In some embodiments, if the maximum file size is reached and no alerts have been generated for the packet flow by the IDPS engine 130, the PCAP file can be deleted, or the content of the PCAP file can be rotated, based on user specification. When the user specification indicates that the file should be deleted when it reaches the maximum-specified file size, the IDPS engine 130 can continue to capture a few additional packets including one with a malicious payload. VMware, Inc.'s NSX-IDPS, for example, currently keeps the last 16 packets of each flow in memory, and as such, if a PCAP file is deleted for a packet flow when an alert is raised, the in-memory packets for the flow can be dumped to the PCAP file and annotated accordingly. For PCAP files that have not reached the maximum size threshold, the IDPS engine 130 continues to capture packets from the flow until the packet flow has ended.

As such, the process 300 determines (at 320) whether the packet flow has ended. When the flow has not yet ended, the process 300 continues to capture packets belonging to the new packet flow in the PCAP file for the packet flow until the flow ends. When the process 300 determines (at 320) that the flow has ended, the process 300 transitions to determine (at 330) whether any alerts were triggered by any packets belonging to the packet flow. When no alerts have been triggered by the packet flow, the process 300 transitions to delete (at 360) the PCAP file for the packet flow. For instance, the IDPS engine 130 deletes PCAP files from the PCAP storage 138 when the corresponding flow has not triggered any alerts while active.

Otherwise, when the process 300 determines (at 330) that at least one alert has been triggered by a packet belonging to the packet flow, the process 300 transitions to annotate (at 340) the PCAP file for the packet flow with contextual data including the signature(s) triggered by the packet(s) belonging to the packet flow.

As described above, each time a packet matches a signature, the IDPS engine annotates the PCAP file for the packet flow to which the packet belongs with the matching signature. In addition to the matching signatures, the IDPS engine also adds other metadata associated with the packet flow to the PCAP file to enable end-users to further investigate the potential threats associated with the matching signatures. Examples of metadata that the IDPS engine adds to the PCAP files, in some embodiments, include VM UUID (e.g., the UUID of the VM that processed the packet when the alert was triggered), IDPS profile UUID, IDPS rule ID, user ID, process ID, and interface name/ID.

The process 300 sends (at 350) the annotated PCAP file to the network manager for analysis and storage. For instance, the IDPS engine 130 retrieves PCAP files 150 corresponding to packet flows that have triggered at least one alert from the PCAP storage 138, and sends the PCAP files 150 to the management plane 112 through the CCP 110. The management plane 112, in some embodiments, includes an IDPS reporting interface and its own PCAP storage where the PCAP files 150 are stored and can be accessed by end-users through a UI provided by the management plane 112, according to some embodiments. The process 300 then deletes (at 360) the PCAP file for the packet flow. Following 360, the process 300 ends.

Figure 5:
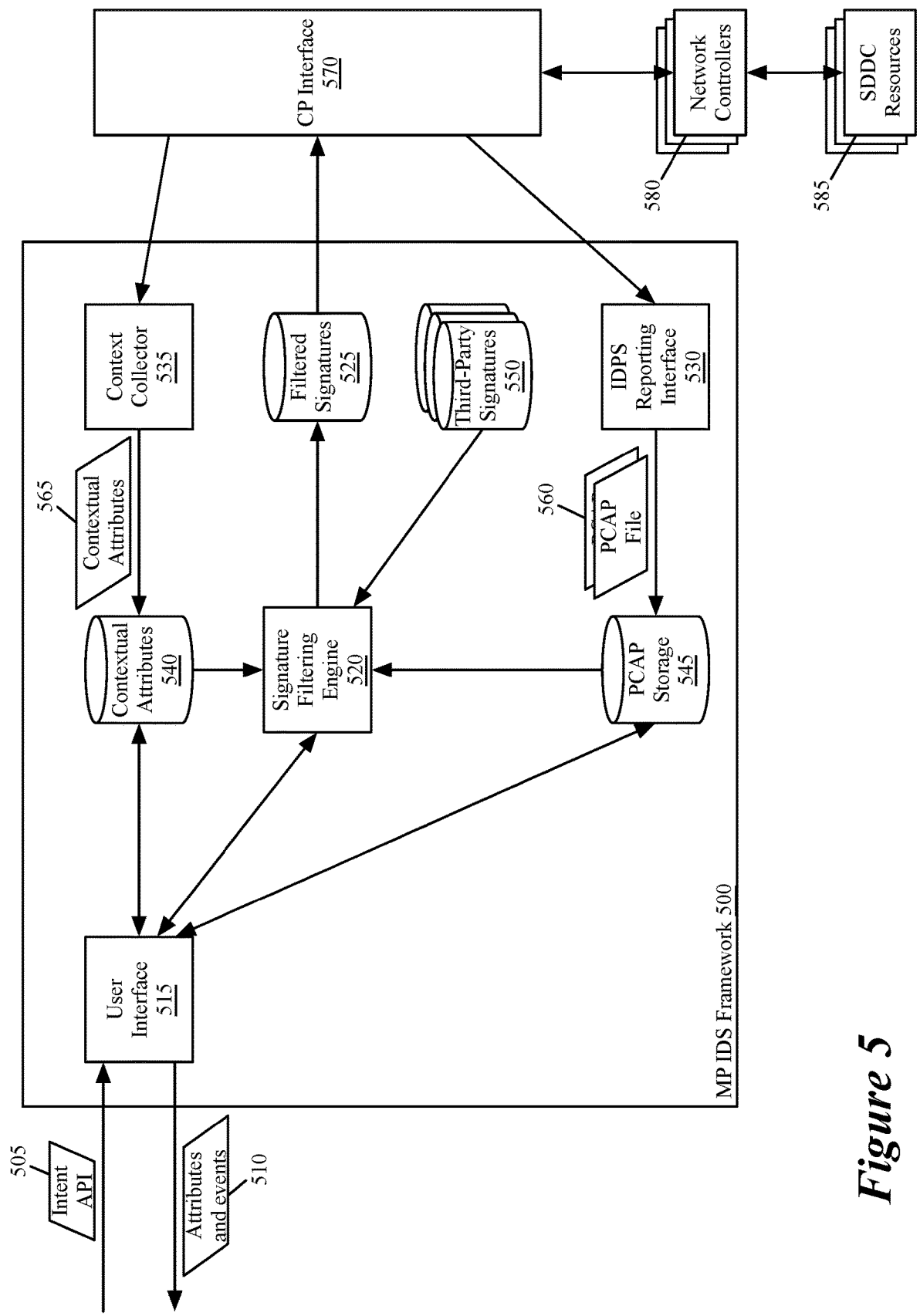
FIG. 5 illustrates an example of a management plane IDPS framework that processes intent-based API commands received from tenant administrators in an SDDC in order to implement intrusion detection policies and signatures in the SDDC, as well as to deploy multi-segmented applications and/or other resources in the SDDC.

FIG. 5 illustrates an example of a management plane IDS framework 500 that processes intent-based API commands received from tenant administrators in an SDDC in order to implement intrusion detection policies and signatures in the SDDC, as well as to deploy multi-segmented applications and/or other resources in the SDDC. The intent-based API commands in some embodiments can specify different sets of intrusion detection signatures for different sets of workloads. Also, in some embodiments, the intent-based API commands can include requests for modifying existing intrusion detection policies (i.e., scripts) and previously deployed multi-segmented applications and resources.

The management plane IDS framework 500 includes a user interface 515, contextual attributes storage 540, a context collector 535, PCAP storage 545, an IDPS reporting interface 530, a signature filtering engine 520, a filtered signatures storage 525, and third-party signatures storages 550. The elements of the management plane IDS framework 500 communicate with a set of network controllers 580 through a control plane interface 570. The set of network controllers 580 communicate with SDDC resources 585 to receive attributes and other information used by the elements of the framework 500 and to implement intrusion detection policies and signatures in the SDDC, and deploy multi-segmented applications and/or other resources in the SDDC.

The IDPS reporting interface 530, in some embodiments, receives PCAP files 560 through the control plane interface 570, and records the received PCAP files 560 in the PCAP storage 545. In some embodiments, each PCAP file 560 corresponds to a different flow processed by the SDDC resources 585. The PCAP files 560 are named according to a five-tuple identifier (i.e., source IP, source port, destination IP, destination port, and direction) associated with the corresponding flow such that each PCAP file 560 uses the naming convention flow_SrcIp_SrcPort_DstIp_DstPort_Direction.pcap. The information in each PCAP file 560 includes at least the signature(s) triggered by the packet(s) belonging to the packet flow, according to some embodiments. In addition to the triggered signature(s), the PCAP files 560 of some embodiments also include additional information associated with the packet flow, such as VM UUID, IDPS profile UUID, IDPS rule ID, user ID, process ID, and interface name/ID.

The context collector 535, as described above, receives contextual attributes through the control plane interface 570, and stores the received contextual attributes in the contextual attribute storage 540, as illustrated by the contextual attributes 565. The contextual attributes 565, in some embodiments, include correlated sets of attributes correlated and provided by data plane correlation engines of IDPS engines implemented on host computers in the SDDC. In some embodiments, these correlated sets of contextual attributes 565 include attributes such as process names, file hashes, publisher information, installation paths, user identities, source and destination addresses, AppID (i.e., traffic type), etc., as well as endpoint and/or network attributes from sources external to the host computer.

The signature filtering engine 520 performs a filtering operation to identify intrusion detection signatures to provide to different host computers based on contextual attributes from the contextual attributes storage 540 that are associated with workloads and processes performed by machines executing on the different host computers. In some embodiments, the signature filtering engine 520 evaluates signatures from multiple sources during the filtering operation, including third-party signatures stored in the third-party signatures storage 550.

In some embodiments, the signature filtering engine 520 performs an initial phase of the filtering operation to curate intrusion detection signatures based on known information about the workloads managed by network managers that implement the management plane before any contextual attributes associated with the workloads have been collected and received. For example, the signature filtering engine 520 would use known information about database servers, application servers, and web servers to identify different sets of intrusion detection signatures applicable to each of the different servers. The signature filtering engine 520 then stores the different sets of curated intrusion detection signatures in the filtered signatures storage 525 so that the signatures can be distributed to the host computers on which machines performing the workloads execute. In some embodiments, performing the filtering operation significantly reduces the number of signatures provided to each host computer (e.g., from tens of thousands of signatures down to hundreds of signatures), thereby improving efficacy of signature matching on the data plane, increasing throughput, and reducing false positives.

As machines on host computers process data message flows, GI agents on the machines and DPI modules on the host computers collect contextual attributes and flow attributes associated with the data message flows and the processes performed on them, and, in some embodiments, the IDPS engines on the host computers correlate the contextual and flow attributes. In some such embodiments, the IDPS engine (e.g., SDDC resources 585) provides the correlated attributes to the network controllers 580, which then provide these attributes to the context collector 535 via the control plane interface 570.

In some embodiments, as the context collector 535 receives correlated sets of attributes and records the attributes to the contextual attribute storage 540, the signature filtering engine 520 retrieves the attributes for use in subsequent filtering operations. The signature filtering engine 520 identifies additional intrusion detection signatures to be pushed to host computers based on the contextual attributes during the subsequent filtering operations, according to some embodiments. The received correlated sets of attributes, in some embodiments, include attributes associated with current and active data message flows. In some such embodiments, the identified additional intrusion detection signatures can include signatures that will be enforced on these current and active data message flows. That is, the management plane IDPS framework 500, in some embodiments, curates intrusion detection signatures to be enforced on current data message flows (i.e., in real-time or near real-time) based on contextual attributes associated with the current flows.

The signature filtering engine 520, in some embodiments, also provides intrusion detection signatures associated with host computers in the datacenters and intrusion detection signatures from the third-party signatures storages 550, for viewing through the UI 515. In some embodiments, users (e.g., network administrators) can select a specific set of workloads for applying a set of intrusion detection signatures. In some embodiments, users select specific workloads based on the contextual attributes and event information 510 that is also provided through the UI 515. In response to such a selection, the signature filtering engine 520, in some embodiments, maps the specific operating systems and processes selected by the user with the signature set and generates a profile identifying the signature set and applicable host computer on which machines that run the specific processes execute. The signature filtering engine 520, in some embodiments, stores these mappings in the filtered signatures storage 525, while in other embodiments, the signature filtering engine 520 stores the mappings in a different storage (not shown).

Figure 6:
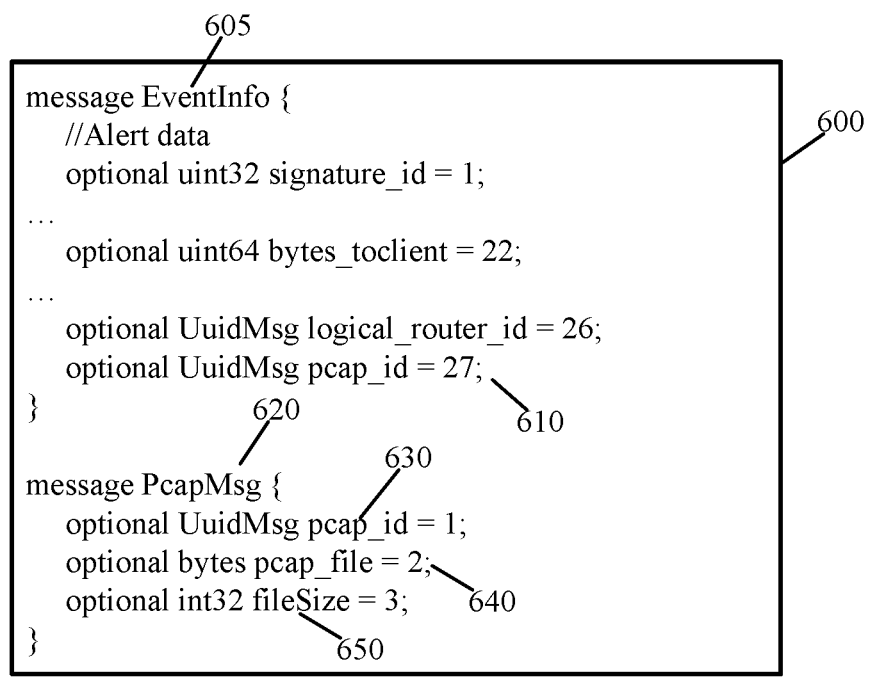
FIG. 6 illustrates an example of a model used in some embodiments to ensure PCAP file data is not duplicated.

In some embodiments, multiple events can reference the same PCAP file data. As such, some embodiments use a particular model to ensure that PCAP file data is not duplicated. FIG. 6 illustrates an example of such a model used in some embodiments to ensure PCAP file data is not duplicated. The model 600 includes a new message type for the PCAP file that includes a unique identifier 630, the PCAP file content 640, and the file size 650. The model 600 uses the current protocol that includes event data, EventInfo 605, and adds a new field for the PCAP identifier 610, which will reference the pcap_id 630 in PcapMsg 620.

In some embodiments, however, the model 600 can lead to failover scenarios. In one example, a host may send an event referencing a PCAP identifier and crash before the actual PCAP message is sent. In some such embodiments, the management plane presents end-users with an appropriate error message. In another example, dangling PCAPs (i.e., only the PCAP message is sent without any reference of it to an event) will be automatically purged after 14 days since the user does not have a direct handle on these PCAPs.

Figure 7:
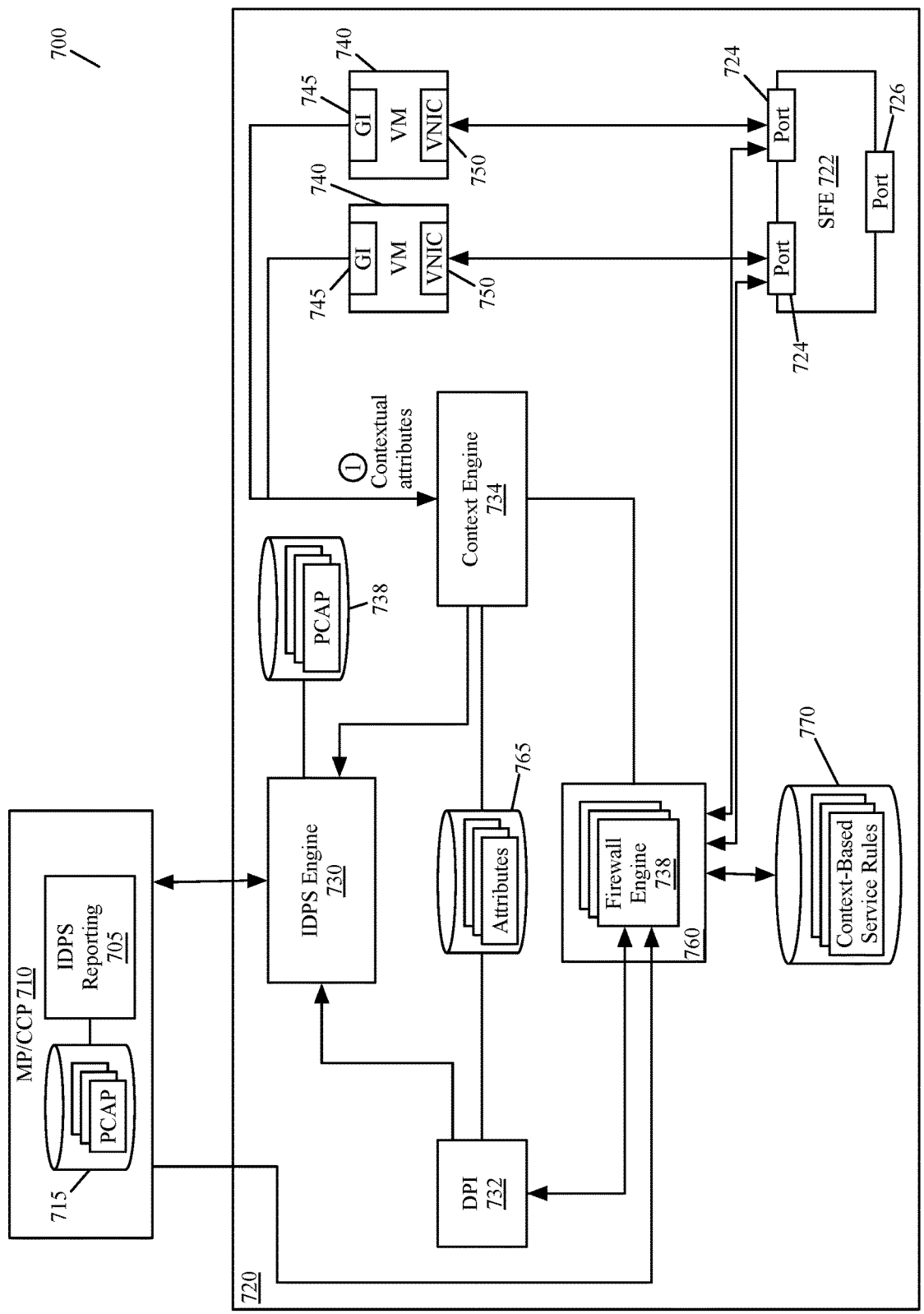
FIG. 7 conceptually illustrates a more detailed example of a datacenter in which the IDPS of some embodiments is implemented.

FIG. 7 conceptually illustrates a more detailed example of a datacenter 700 in which the intrusion detection and prevention system of some embodiments is implemented. The datacenter 700 includes a management plane/central control plane 710 and a host computer 720. The management plane/central control plane 710 includes an IDPS reporting engine 705 and a PCAP storage 715. The host computer 720 includes VMs 740, a software forwarding element (SFE) 722, an IDPS engine 730, a PCAP storage 738, a context engine 734, a DPI engine 732, service engines 760, attribute storage 765, and context-based rules storage 770. Additionally, the VMs 740 include GI agents 745 and VNICs 750, the service engines 760 include at least firewall engine 768, and the SFE 722 includes ports 724 and 726.

Each VNIC 750 of each VM 740 is responsible, in some embodiments, for exchanging messages between its VM 740 and the SFE 722. Each VNIC 750 connects to a particular port 724 of the SFE 722. The SFE 722 also connects to a physical network interface card (PNIC) (not shown) of the host. In some embodiments, the VNICs 750 are software abstractions created by the hypervisor of one or more PNICs of the host.

In some embodiments, the SFE 722 maintains a single port 724 for each VNIC 750 of each VM 740. The SFE 722 connects to the host PNIC (through a NIC driver (not shown)) to send outgoing messages and to receive incoming messages. In some embodiments, the SFE 722 is defined to include a port 726 that connects to the PNIC's driver to send and receive messages to and from the PNIC. The SFE 722 performs message-processing operations to forward messages that it receives on one of its ports to another one of its ports. For example, in some embodiments, the SFE 722 tries to use data in the message (e.g., data in the message header) to match a message to flow-based rules, and upon finding a match, to perform the action specified by the matching rule (e.g., to hand the message to one of its ports 724 or 726, which directs the message to be supplied to a destination VM or to the PNIC).

In some embodiments, the SFE 722 is a software switch, while in other embodiments it is a software router or a combined software switch/router. The SFE 722 in some embodiments implements one or more logical forwarding elements (e.g., logical switches or logical routers) with the SFE 722 executing on other hosts in a multi-host environment. A logical forwarding element in some embodiments can span multiple hosts to connect VMs that execute on different hosts but belong to one logical network.

Different logical forwarding elements can be defined to specify different logical networks for different users, and each logical forwarding element can be defined by multiple software forwarding elements on multiple hosts. Each logical forwarding element isolates the traffic of the VMs of one logical network from the VMs of another logical network that is serviced by another logical forwarding element. A logical forwarding element can connect VMs executing on the same host and/or different hosts. In some embodiments, the SFE extracts from a packet a logical network identifier (e.g., a VNI) and a MAC address. The SFE in these embodiments uses the extracted VNI to identify a logical port group, and then uses the MAC address to identify a port within the port group.

Software switches (e.g., software switches of hypervisors) are sometimes referred to as virtual switches because they operate in software and they provide the VMs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013 May 8), "VXLAN: A Framework for Overlaying Virtualized Layer 2 Networks over Layer 3 Networks," IETF.

The ports 724 of the SFE 722 in some embodiments include one or more function calls to one or more modules that implement special input/output (I/O) operations on incoming and outgoing messages that are received at the ports. Examples of I/O operations that are implemented by the ports 724 include ARP broadcast suppression operations and DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports 724 can implement a chain of I/O operations on incoming and/or outgoing messages in some embodiments. Also, in some embodiments, other modules in the data path (such as the VNICs 750, port 726, etc.) implement the I/O function call operations instead of, or in conjunction with, the ports 724.

In some embodiments, one or more of function calls of the SFE ports 726 can be to one or more service engines 760 that process context-based service rules in the context-based service rules storage 770. The context-based service rules storage 770, in some embodiments, can also include intrusion detection rules to be enforced by the firewall engine 768, or another service engine, in some embodiments. Also, while the DPI engine 732 is shown separately from the service engines 760, other embodiments may include the DPI engine 732 as one of the service engines 760. In some embodiments, each service engine 760 has its own context-based service rules storage 770. Also, in some embodiments, each VM 740 has its own instance of each service engine 760. In other embodiments, one service engine can service packet flows for multiple VMs on a host (e.g., VMs for the same logical network).

To perform its service operation for a packet flow, a service engine 760 in some embodiments tries to match the flow identifier (e.g., the five-tuple identifier) and/or the flow's associated context attribute set to the rule identifiers of its service rules in its context-based service rules storage 770. Specifically, for a service engine 760 to perform its service check operation for a packet flow, the SFE port 724 that calls the service engine 760 supplies a set of attributes of a message that the port 724 receives. In some embodiments, the set of attributes are message identifiers, such as traditional five-tuple identifiers. In some embodiments, one or more of the identifier values can be logical values that are defined for a logical network (e.g., can be IP addresses defined in a logical address space). In other embodiments, all of the identifier values are defined in the physical domain. In still other embodiments, some of the identifier values are defined in the logical domain, while other identifier values are defined in the physical domain.

In some embodiments, the context-based service rules storage 770 is defined in a hierarchical manner to ensure that a message rule check will match a higher priority rule before matching a lower priority rule, when the message's attribute subset matches multiple rules. Also, in some embodiments, the context-based service rules storage 770 contains a default rule that specifies a default action for any message rule check that cannot identify any other service rules; this default rule will be a match for all possible attribute subsets in some embodiments, and ensures that the service rule engine will return an action for all received attribute subsets. In some embodiments, the default rule will specify no service.

Multiple messages can have the same message identifier attribute sets, e.g., when the messages are part of one flow that is associated with one communication session between two machines. Accordingly, after matching a packet with a service rule in the context-based service rules storage 770 based on the message's identified context attribute set, the service engine 760 of some embodiments stores the service rule (or a reference to the service rule) in a connection state cache storage (not shown), so that it can later use this service rule for subsequent packets of the same flow.

In some embodiments, the DPI engine 732 performs deep packet inspection on a packet flow at the direction of the firewall engine 768. Specifically, when the firewall engine 768 receives a new packet that is part of a new packet flow, the firewall engine 768 in some embodiments directs the DPI engine 732 to inspect that new packet and one or more of the next few packets in the same flow. Based on this examination, the DPI engine 732 identifies the type of traffic (i.e., the application on the wire) that is being sent in this packet flow, generates an AppID for this traffic type, stores this AppID in the attribute storage 765, and provides the AppID to the IDPS engine 730. In some embodiments, the context attribute sets are stored in the attribute storage 765 based on flow identifiers and/or process identifiers. Accordingly, in some embodiments, the DPI engine 732 stores the AppID for a new packet flow in the attribute storage 765 based on that flow's five-tuple identifier.

In some embodiments, the context engine 734 pushes to the service engines 760 the AppID for a new packet flow once the DPI engine 732 stores the AppID in the attribute storage 765. In other embodiments, the context engine 734 pulls the AppID from the attribute storage 765 whenever it is queried for the contextual attributes for a packet flow by a service engine 760. In some embodiments, the context engine 734 uses the five-tuple identifier of the flow to identify the record in the attribute storage 765 with the matching record identifier and the AppID.

When a process starts on one of the VMs 740, the GI agent 745 of that VM 740 provides a process event identifier to the context engine 734 (e.g., via a MUX, not shown), which then provides the process event identifier to the IDPS engine 730. Additionally, after the DPI engine 732 performs DPI to obtain the AppID and the context engine 734 receives contextual attributes from the GI agents 745, the DPI engine 732 and the context engine 734 then provide to the IDPS engine 730 the AppID and contextual attributes. In some embodiments, the IDPS engine 730 automatically receives contextual attributes from the DPI engine 732 and context engine 734 on a per-packet basis, or a per-flow basis, while in other embodiments, the IDPS engine 730 requests contextual attributes from the DPI engine 732 and context engine 734 on a per-packet basis, or a per-flow basis.

The IDPS engine 730 uses the contextual attributes it receives from the DPI engine 732 and the context engine 734 to annotate the PCAP file for the associated flow in its PCAP storage 738. If any alerts are triggered and/or any signatures are matched to packets belonging to the packet flow, the IDPS engine 730 also annotates the PCAP file for the associated flow in its PCAP storage 738 to reflect the matched signatures.

In some embodiments, when the IDPS engine 730 is configured, the configuration file (e.g., yet another markup language (YAML) file) can also be extended to limit the maximum number of PCAP files opened at a given time (e.g., based on a maximum number of flows that the IDPS engine 730 can handle for a given setup). This setting depends, in some embodiments, on the available resources on the host and the optimal value can be decided based on experimentation. If the host machine is running out of memory, the packet capture feature for the IDPS engine 730 can be disabled, in some embodiments, and end-users can be notified via IDPS alarm about the low memory available on the host, according to some embodiments.

Once the packet flow ends (e.g., is terminated), the IDPS engine 730 checks whether any packets of the packet flow have matched to any signatures. The IDPS engine 730 then either deletes the PCAP file when no packets belonging to the flow have matched to any signatures, or sends the annotated PCAP file to the management plane/central control plane 710 and then deletes the PCAP file from its PCAP storage 738. In other embodiments, the IDPS engine 730 instead sends annotated PCAP files to a designated datastore (not shown) where it can be accessed by end-users (e.g., network administrators). At the management plane/central control plane 710, the IDPS reporting engine 705 receives the PCAP files sent from the IDPS engine 730 on the host 720, and stores the PCAP file in its own PCAP file storage 715, in some embodiments, where the PCAP file can be accessed by end-users through a UI (not shown) provided by the management plane/central control plane 710.

In some embodiments, as also mentioned above, the management plane/central control plane 710 is configured to perform analyses on the PCAP files it receives from host computers 720 in addition to storing the PCAP files and providing the PCAP files for viewing by users. Certain signatures, or other information used to annotate the PCAP files can trigger certain actions by the management plane/central control plane 710, in some embodiments. For example, a PCAP file annotated with a particular process identifier corresponding to a particular process, a machine identifier associated with a VM that executes the particular process, and a particular signature ID triggered by the particular process can trigger the management plane/central control plane 710 to redirect traffic from the VM that executes the offending process to a different VM, in some embodiments. In another example, a particular signature ID used to annotate a PCAP file can trigger the management plane/central control plane 710 to send an alert to users through the UI, in some embodiments.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
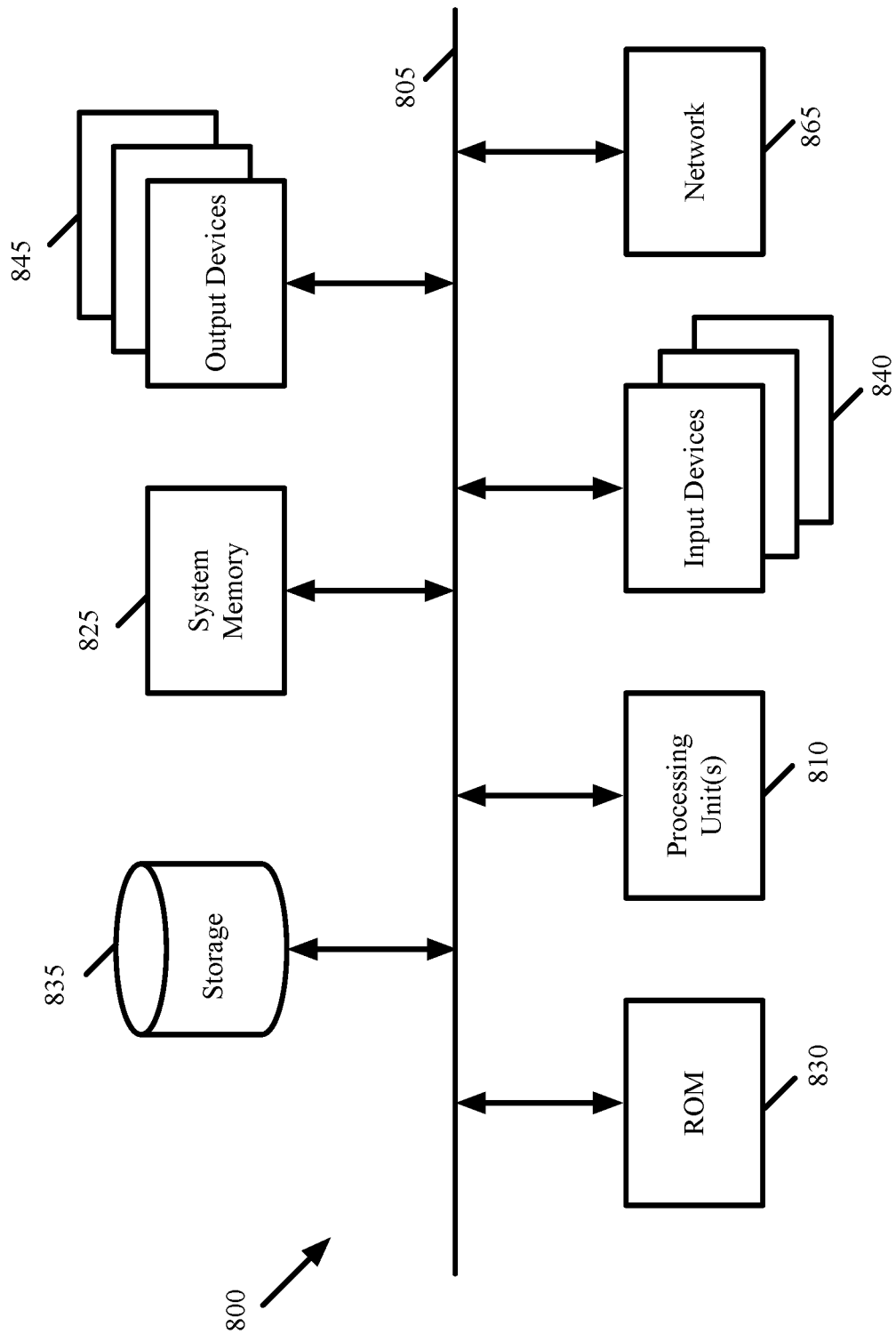
FIG. 8 conceptually illustrates a computer system with which some embodiments of the invention are implemented.

FIG. 8 conceptually illustrates a computer system 800 with which some embodiments of the invention are implemented. The computer system 800 can be used to implement any of the above-described hosts, controllers, gateway, and edge forwarding elements. As such, it can be used to execute any of the above described processes. This computer system 800 includes various types of non-transitory machine-readable media and interfaces for various other types of machine-readable media. Computer system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) 810 may be a single processor or a multi-core processor in different embodiments. The read-only-memory (ROM) 830 stores static data and instructions that are needed by the processing unit(s) 810 and other modules of the computer system 800. The permanent storage device 835, on the other hand, is a read-and-write memory device. This device 835 is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory 825 is a volatile read-and-write memory, such as random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices 840 enable the user to communicate information and select commands to the computer system 800. The input devices 840 include alphanumeric keyboards and pointing devices (also called "cursor control devices"). The output devices 845 display images generated by the computer system 800. The output devices 845 include printers and display devices, such as cathode ray tubes (CRT) or liquid crystal displays (LCD). Some embodiments include devices such as touchscreens that function as both input and output devices 840 and 845.

Finally, as shown in FIG. 8, bus 805 also couples computer system 800 to a network 865 through a network adapter (not shown). In this manner, the computer 800 can be a part of a network of computers (such as a local area network ("LAN"), a wide area network ("WAN"), or an Intranet), or a network of networks (such as the Internet). Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. For an intrusion detection and prevention system (IDPS) engine operating on a host computer deployed in a software-defined datacenter (SDDC), a method for detecting and analyzing malicious packet flows, the method comprising:
   upon detecting a new packet flow, capturing packets belonging to the new packet flow in a file;
   when the new packet flow ends, determining that a particular packet belonging to the new packet flow has triggered an alert indicating the particular packet includes a potentially malicious payload;
   annotating the file for the new packet flow with a set of contextual data that (i) specifies the new packet flow as a potentially malicious packet flow and (ii) identifies the particular packet and at least one signature associated with the alert triggered by the particular packet; and
   sending the annotated file to a network management server to analyze the set of contextual data to extract further information regarding the potentially malicious payload.

2. The method of claim 1, wherein the network management server provides the annotated file to a network administrator through a user interface.

3. The method of claim 1, wherein capturing packets belonging to the new packet flow in the file further comprises storing the file in a particular storage structure on the host computer that is accessible to the IDPS engine and that is designated for storing packet capture files.

4. The method of claim 3 further comprising deleting the annotated file from the particular storage structure on the host computer after sending the annotated file to the network management server.

5. The method of claim 3, wherein the file is stored in the particular storage structure by the IDPS engine using a naming convention comprising a five-tuple identifier associated with the new flow.

6. The method of claim 1, wherein the set of contextual data used to annotate the file further comprises two or more of a virtual machine (VM) unique user identifier (UUID), a IDPS profile UUID, a IDPS rule identifier, a user identifier, a process identifier, and an interface identifier.

7. The method of claim 1, wherein the at least one signature specifies an action to perform on the particular packet.

8. The method of claim 7, wherein the specified action comprises one of alert, drop, and reject.

9. The method of claim 1, wherein the new packet flow is a first new packet flow and the file is a first file, the method further comprising:
   upon detecting a second new packet flow, capturing packets belonging to the second new packet flow in a second file, wherein each of the first and second files are stored in a particular storage structure on the host computer that is accessible to the IDPS engine and that is designated for storing packet capture files;
   when the second new packet flow ends, determining that the second new packet flow did not trigger any alerts indicating packets belonging to the second new packet flow include malicious payloads; and
   based on the determination that the second new packet flow did not trigger any alerts, deleting the second file from the particular storage structure without sending the second file to the network management server.

10. The method of claim 1, wherein the file comprises a PCAP file and the particular storage structure comprises a PCAP storage.

11. The method of claim 10, wherein the PCAP file is configured with a maximum size threshold.

12. The method of claim 1, wherein sending the annotated file to the network management server comprises sending the annotated file to a particular datastore of the network management server.

13. The method of claim 1, wherein the IDPS engine is part of a distributed IDPS comprising a plurality of IDPS engines deployed across a plurality of hosts computers and a plurality of network forwarding elements, wherein the network management server receives annotated files from the plurality of IDPS engines.

14. The method of claim 1, wherein upon analyzing the annotated file, the network management server performs at least one action based on the at least one signature associated with the alert triggered by the particular packet.

15. The method of claim 13, wherein the at least one action comprises sending an alert to a network administrator through a user interface provided by the network management server indicating the at least one signature associated with the alert has been triggered by the particular packet.

16. A non-transitory machine readable medium storing a program for execution by a set of processing units of a host computer, the program for implementing at least one intrusion detection and prevention system (IDPS) engine on the host computer in a software-defined datacenter (SDDC), the IDPS engine for detecting and analyzing malicious packet flows, the program comprising sets of instructions for:
    upon detecting a new packet flow, capturing packets belonging to the new packet flow in a file;
    when the new packet flow ends, determining that a particular packet belonging to the new packet flow has triggered an alert indicating the particular packet includes a potentially malicious payload;
    annotating the file for the new packet flow with a set of contextual data that (i) specifies the new packet flow as a potentially malicious packet flow and (ii) identifies the particular packet and at least one signature associated with the alert triggered by the particular packet; and
    sending the annotated file to a network management server to analyze the set of contextual data to extract further information regarding the potentially malicious payload.

17. The non-transitory machine readable medium of claim 16, wherein the network management server provides the annotated file to a network administrator through a user interface.

18. The non-transitory machine readable medium of claim 16, wherein:
    the set of instructions for capturing packets belonging to the new packet flow in the file further comprises a set of instructions for storing the file in a particular storage structure on the host computer that is accessible to the IDPS engine and that is designated for storing packet capture files; and
    the set of instructions for sending the annotated file to a network management server to analyze the set of contextual data to extract further information regarding the potentially malicious payload further comprises a set of instructions for deleting the annotated file from the particular storage structure on the host computer after sending the annotated file to the network management server.

19. The non-transitory machine readable medium of claim 16, wherein the set of contextual data used to annotate the file further comprises two or more of a virtual machine (VM) unique user identifier (UUID), a IDPS profile UUID, a IDPS rule identifier, a user identifier, a process identifier, and an interface identifier.

20. The non-transitory machine readable medium of claim 16, wherein the new packet flow is a first new packet flow and the file is a first PCAP file, the program further comprising sets of instructions for:
    upon detecting a second new packet flow, capturing packets belonging to the second new packet flow in a second PCAP file, wherein each of the first and second PCAP files are stored in a particular storage structure on the host computer that is accessible to the IDPS engine and that is designated for storing PCAP files;
    when the second new packet flow ends, determining that the second new packet flow did not trigger any alerts indicating packets belonging to the second new packet flow include malicious payloads; and
    based on the determination that the second new packet flow did not trigger any alerts, deleting the second PCAP file from the particular storage structure without sending the second PCAP file to the network management server.

* * * * *